June 26, 1962 — E. G. KELLER — 3,040,668
CENTRIFUGAL PUMP AND MOTOR
Filed Sept. 26, 1960
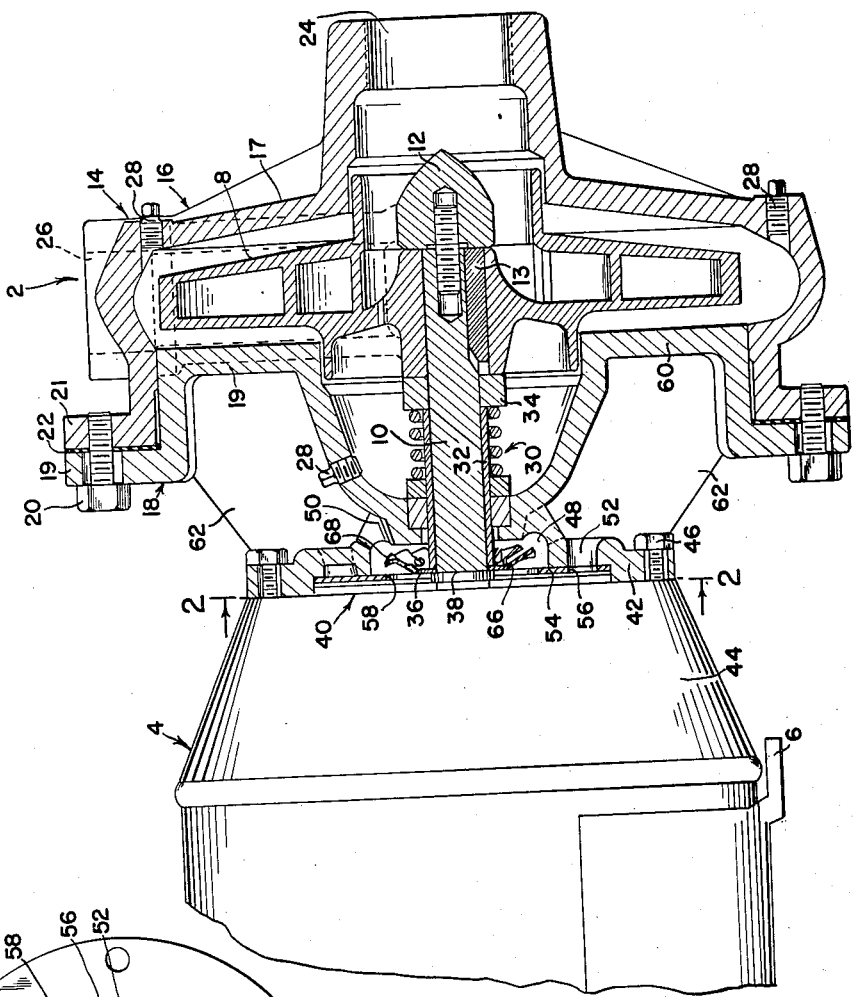
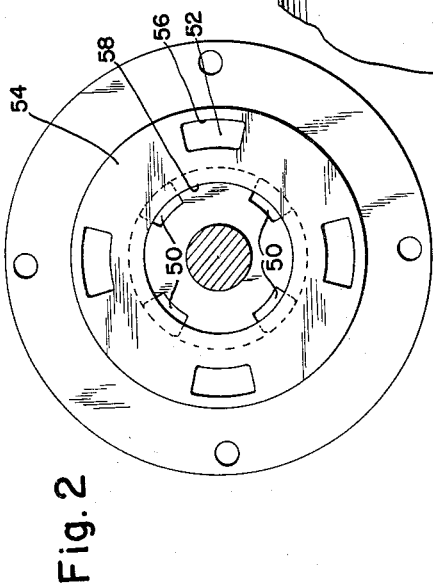
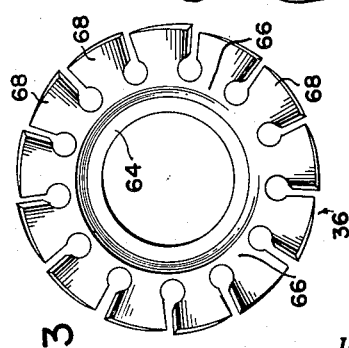
INVENTOR.
Edwin George Keller
BY Curtis, Morris & Safford
ATTORNEYS

United States Patent Office 3,040,668
Patented June 26, 1962

3,040,668
CENTRIFUGAL PUMP AND MOTOR
Edwin George Keller, West Hartford, Conn., assignor to Dunham-Bush, Inc., West Hartford, Conn.
Filed Sept. 26, 1960, Ser. No. 58,571
2 Claims. (Cl. 103—87)

This invention relates to motor-driven pumps, and to a unitary construction thereof. More particularly, the invention relates to a centrifugal water pump and its driving motor and means to prevent the migration of the water and water vapor from the pump to the motor.

An object of this invention is to provide an improved pump and electric motor. A further object is to provide an improved centrifugal motor pump for use in circulating water. A further object is to provide an improved combination motor and centrifugal pump which avoids difficulties which have been encountered with such constructions in the past. A further object is to provide an effective water and vapor barrier between a pump and a motor driving it. A further object is to provide for the above with a construction which is inexpensive, simple, compact, efficient, dependable and adaptable to various conditions of operation. These and other objects will be in part obvious, and in part pointed out below.

In the drawings:

FIGURE 1 is a sectional view of one embodiment of the invention, with parts broken away;

FIGURE 2 is a sectional view on the line 2—2 of FIGURE 1; and

FIGURE 3 is an enlarged plan view of the fan and slinger unit of FIGURE 1.

Referring to FIGURE 1 of the drawing, a pump 2 is driven by a motor 4, and is supported directly by the motor which, in turn, is supported through a mounting base 6 rigidly clamped to a supporting frame (not shown). Pump 2 has a centrifugal motor or impeller 8 clamped to the extension of the motor shaft 10 by a nut 12, and keyed to the shaft by a key 13. Impeller 8 is enclosed within the pump housing 14 formed by a main housing 16 at the right and a housing 18 at the left.

Housings 16 and 18 provide side walls 17 and 19 which have mating peripheral flanges clamped together by a plurality of stud bolts 20, with a gasket 22 providing a seal. At the right, the housing is provided with a liquid inlet opening 24 and, at the top, there is a radial discharge opening 26. The housing has three drain and vent openings closed by screw plugs 28. At the left, there is a shaft seal and bearing assembly 30 which is snugly received in the housing wall to provide a fluid-tight seal therewith. Mounted on shaft 10 within bearing 30 is a sleeve 32. The right-hand ends of assembly 30 and sleeve 32 are engaged by a sealing bearing 34 which, in turn, is engaged by the hub of the pump impeller 8. The left-hand end of sleeve 32 engages the inner periphery of an annular slinger fan 36, and clamps this fan tightly against a shoulder 38 formed by a larger diameter portion of shaft 10. As indicated above, nut 12 holds the impeller onto shaft 10, and it clamps sealing bearings 34 and assembly 30 together so as to provide a fluid-tight seal between the left-hand end of the impeller hub and the left-hand wall of the pump housing. Liquid, e.g., water, is circulated by this pump and, when passing through the pump, provides a satisfactory cooling medium for the bearings. There is a tendency for water and vapor to seep through sealing bearing 34 and assembly 30, and thus escape at the left of the pump housing. Water and vapor thus escaping tend to migrate into the motor and create difficulties, such as rusting, corroding, and even short circuiting of the electrical wiring. The present invention provides a very satisfactory remedy for that difficulty.

Integral with housing 18 at the left, is an annular wall construction 40 which has a peripheral flange portion 42 which is clamped to the end bell 44 of motor 4 by four stud bolts 46. In this way, the pump housing is rigidly supported from the motor housing. Wall construction 40 provides a central annular chamber 48 which is enlarged at its outer periphery and within which the slinger fan 36 is positioned. Extending from chamber 48 radially outwardly and to the right (see the upper portion of FIGURE 1) are four evenly spaced air discharge openings 50 (see also FIGURE 2). As shown in the lower portion of FIGURE 1, the wall structure 40 also includes four evenly spaced inlet openings 52 which extend axially, and which provide for the flow of air generally toward the motor. To the left of chamber 48, is an annular disk 54 which has four openings 56 of the same size and in alignment with the air inlet openings 52. Hence, each opening 52 and its aligned opening 56 provide for the entry of air into the end bell of the motor. Disk 54 also has a central opening 58 which forms an annular opening around shaft 10 from the end bell of the motor into chamber 48. It is thus seen that an air path is provided for the circulation of air into the end bell through openings 52 and 56, thence axially from the end bell toward the pump into chamber 48, and then radially outwardly through the four discharge openings 50.

As shown in FIGURE 2, the four sets of air inlet openings 52—56 are radially spaced from the air outlet openings 50, and are alternated radially so that there is first an air inlet opening, then an air outlet opening, then an air inlet opening, etc. The air inlet and discharge openings are within the annular zone or space between flange portion 42 and the main pump housing wall 19 of housing 18. However, each of these openings is separated from the next adjacent openings by an integral web or radial baffle 62 which extends from flange portion 42 across to the pump housing wall 19. Therefore, the webs or baffles 62 form radial passageways between the periphery of the pump and motor for each of the air inlet passageways 52, and also for each of the air outlet passageways 50.

As indicated above, slinger fan 36 is positioned within chamber 48 and is rigidly mounted on the shaft so as to rotate therewith. As shown in FIGURE 3, slinger fan 36 is formed of a single piece of sheet metal with a central ring portion 64 and thirteen equally spaced slinger arms 66. Each of arms 66 has a fan shaped end portion 68, and (see FIGURE 1) the arms extend radially outwardly and axially toward the right into the enlarged portion of chamber 48. During operation, the pump shaft is driven at a high rate of speed by the motor, and the slinger fan is rotated with the shaft and impels air to the right and outwardly through the outlet openings 50. This causes a flow of air inwardly through the passageways 52—56 to the end bell of the motor, and thence radially along shaft 10 away from the motor and into chamber 48. Hence, there is a constant flow of air from the motor along the shaft toward the pump, and then outwardly through openings 50. The inflowing streams of air are separated from the outflowing streams by the radial webs or baffles 62. The slinger fan also intercepts any moisture or vapor which migrates from the pump along shaft 10 or sleeve 32, or even along the pump casing. Water or vapor thus intercepted passes from the central annular portion 64 of the slinger fan radially outwardly along the slinger arms is thrown by centrifugal force from the fan portions 68. The air movement assists this action, and the water or vapor is either thrown directly through the outlet openings 50, or it is collected on the annular outer peripheral wall of chamber 48, and then is impelled through the outlet openings. In this way, the water and vapor are discharged from the periphery of the motor pump unit, and the radial relationship between the webs or baffles 62 aids in dispersing the water and vapor. The air is being drawn in at the periphery of webs or baffles 62 at such a slow rate that the water and vapor are not re-entrained into the incoming air.

The circulation of the air into the end of the motor is utilized to promote the cooling of the motor. Also, the heat from the motor which is taken on by the air tends to vaporize the water or vapor which is picked up by the air in chamber 48.

I claim:

1. In apparatus of the character described, the combination of, a pump drive shaft, a pump casing construction including an annular side wall surrounding and providing a seal around said shaft, a driving motor connected to drive said shaft, an annular structure surrounding said drive shaft between said motor and said annular side wall, the above mentioned construction and structure forming an annular chamber between said annular structure and said annular sidewall which is open radially inwardly and is provided with a plurality of exhaust openings extending radially outwardly, the surface defining said annular chamber being contiguous with the surfaces defining said exhaust openings, a slinger fan mounted on said shaft and adapted to direct a stream of air and any moisture present outwardly between said annular side wall and said annular structure, and baffle means to direct air radially inwardly adjacent said motor and thence axially through said annular structure toward said seal and radially outwardly under the action of said slinger fan against said surfaces defining said annular chamber and thence through said exhaust openings with the water tending to flow along said surfaces and outwardly under the influence of air.

2. Apparatus as described in claim 1, wherein said impeller has a plurality of radial arms projecting radially outwardly from said shaft axially toward said pump casing construction and having end portions shaped to impel the air and water outwardly.

References Cited in the file of this patent

UNITED STATES PATENTS

| | | |
|---|---|---|
| 2,140,356 | Gutmann | Dec. 13, 1938 |
| 2,478,649 | Wightman | Aug. 9, 1949 |
| 2,936,715 | Southam et al. | May 17, 1960 |
| 2,936,774 | Holley et al. | May 17, 1960 |